(12) United States Patent
Chuang et al.

(10) Patent No.: US 7,740,945 B2
(45) Date of Patent: Jun. 22, 2010

(54) BRIGHTNESS ENHANCEMENT FILM

(75) Inventors: Shih Yi Chuang, Kaohsiung (TW);
Chao Yi Tsai, Kaohsiung (TW); Guo Long Wu, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 0 days.

(21) Appl. No.: 11/544,816

(22) Filed: Oct. 6, 2006

(65) Prior Publication Data

US 2007/0082218 A1 Apr. 12, 2007

(30) Foreign Application Priority Data

Oct. 7, 2005 (TW) .............................. 94135195 A

(51) Int. Cl.
*B32B 15/00* (2006.01)

(52) U.S. Cl. ...................................... 428/426; 428/432
(58) Field of Classification Search ................. 428/701, 428/702, 432, 426
See application file for complete search history.

(56) References Cited

U.S. PATENT DOCUMENTS

2006/0291055 A1* 12/2006 Gehlsen et al. ............. 359/486

* cited by examiner

*Primary Examiner*—Timothy M Speer
(74) *Attorney, Agent, or Firm*—Ladas & Parry LLP

(57) ABSTRACT

A brightness enhancement film is provided, which comprises a substrate with a light diffusion layer having a convex-concave structure on one side of the substrate. The brightness enhancement film of the present invention can be used in liquid crystal displays (LCDs) as a light diffusion brightness enhancement film.

10 Claims, 3 Drawing Sheets

PRIOR ART

BRIGHTNESS ENHANCEMENT FILM

BACKGROUND OF THE INVENTION

1. Field of Invention

The present invention relates to a brightness enhancement film, and more particularly, to a light-diffusion brightness enhancement film suitable for use in a liquid crystal display (LCD).

2. Description of the Prior Art

Generally speaking, the structure of a liquid crystal display (LCD) mainly comprises two parts, i.e., a panel and a backlight module, where the panel includes, for example, an indium-tin-oxide (ITO) conductive glass, liquid crystals, an alignment film, a color filter, a polarizer, and a driving integrated circuit, and the backlight module includes, for example, a lamp, a light guide, and various optical films. In order to make an LCD exhibit desired viewing angles and colors, many attempts have been done in this regard. For example, it is known that the luminance of an LCD panel may be enhanced by increasing the number of lamps. Nevertheless, the increase in the number of lamps would result in the storage of an excess of heat in the structure so as to adversely-affect the shelf life and quality of other parts in the LCD. Moreover, it is necessary to consume more electricity, and this is not suitable for those information goods relying on battery power to provide to the required electricity. Up to now, there have been various optical films which can be used in back light modules to enhance the luminance of LCD panels and increase the efficiency of the light source, without the need of changing the design of the parts or consuming excess energy. Thus, the use of an optical film became a more economic and convenient approach for increasing luminance.

A brightness enhancement film, which is also known as a prism film, has a fine prism structure formed on a polyester optical film having a thickness of only 50-200 µm by curing a special acrylic resin with a high energy UV light on the polyester optical film. The main function of the brightness enhancement film is to collect the disordered light emitted from a light guide to various directions by refraction and total internal reflection, and direct the light to an on-axis direction of about ±35 degrees, so as to enhance the luminance of the LCD.

There are many patents disclosing the utilization of a brightness enhancement film in a backlight module. For example, WO 96/23649, filed by 3M Company, discloses a method for preventing the vertex angles of a condensing prism structure from collapsing and sinking, which method comprises heating a completed prism film to a temperature above the glass transition temperature of the resin, so as to increase the hardness of the vertex angles of the condensing prism structure. However, the brightness enhancement film disclosed in WO 96/23649, as shown in FIG. 1, has a condensing structure on only one surface and the other surface is smooth, which cannot effectively diffuse and then condense evenly the light from a light source, and thus results in a poor uniformity of light.

A common solution to the above problem used in industry is to place a diffusion film under the brightness enhancement film. However, this solution faces the disadvantages that the manufacture cost is increased and the backlight module becomes more complex. FIG. 2 is a schematic view of a conventional backlight module for condensing light. As shown in FIG. 2, a diffusion film (2) is disposed between a light source (1) and a brightness enhancement film (3). In view of the above, the present invention provides a brightness enhancement film for overcoming the above disadvantages.

For example, according to an embodiment of the present invention, as shown in FIG. 3, a resin mixed with plastic particles is coated on the back surface of a brightness enhancement film of WO 96/23649, and then, the resin is molded by curing. With the brightness enhancement film of the present invention, the light is uniformized by the resin mixed with plastic particles and then condensed by the prism structure, thereby achieving a better light uniformity.

SUMMARY OF THE INVENTION

The main object of the present invention is to provide a brightness enhancement film, which comprises a substrate with a light diffusion layer having a convex-concave structure on one side of the substrate.

DESCRIPTION OF EMBODIMENTS

Figure 1:
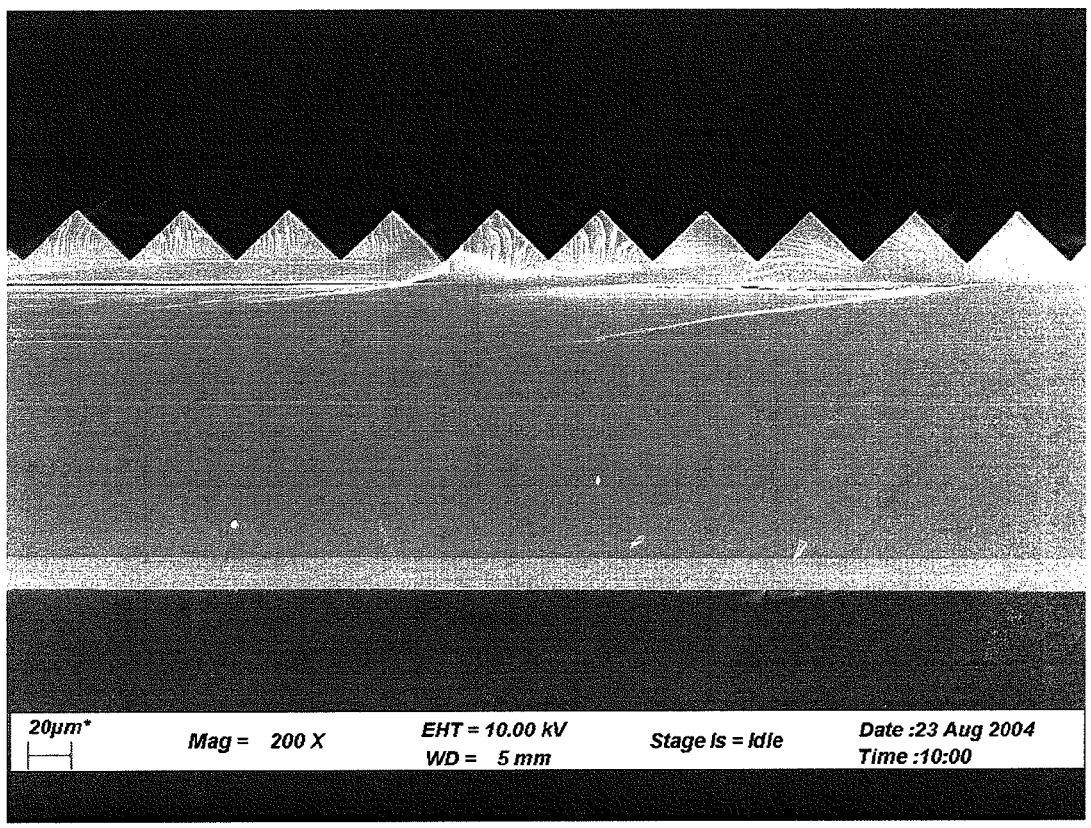
FIG. 1 is a schematic view of a brightness enhancement film disclosed in WO 96/23649.
Figure 2:
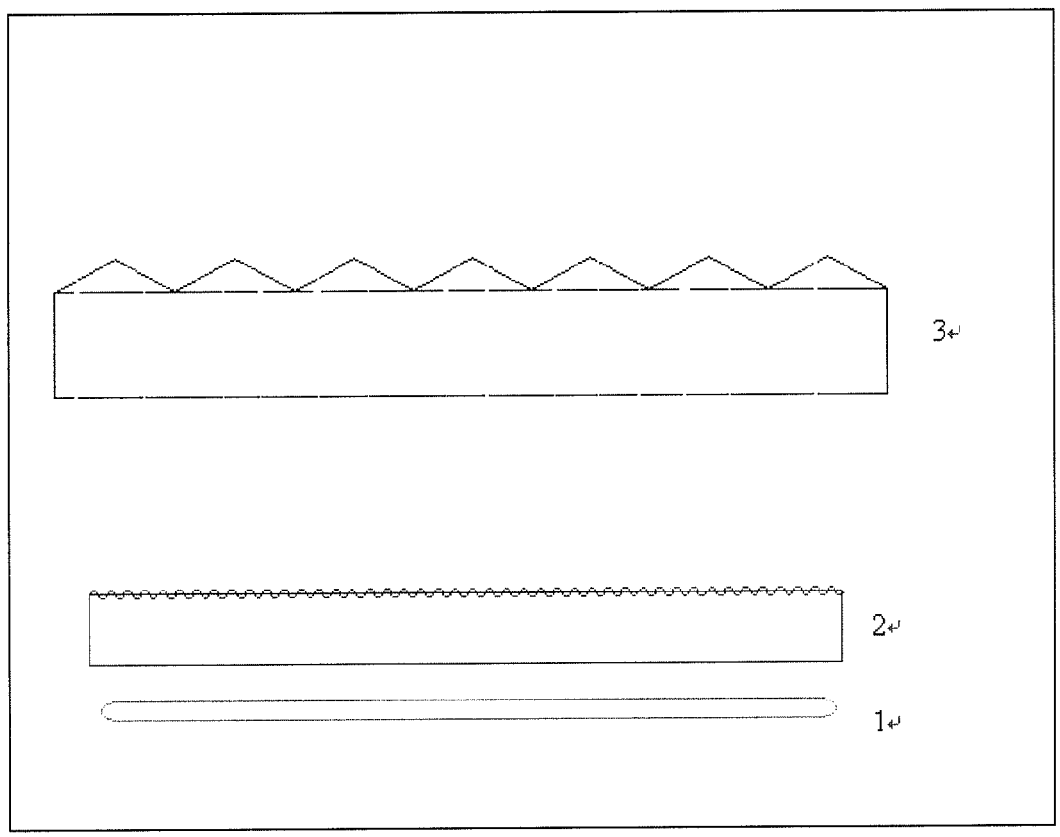
FIG. 2 is a schematic view of a conventional backlight module.
Figure 3:
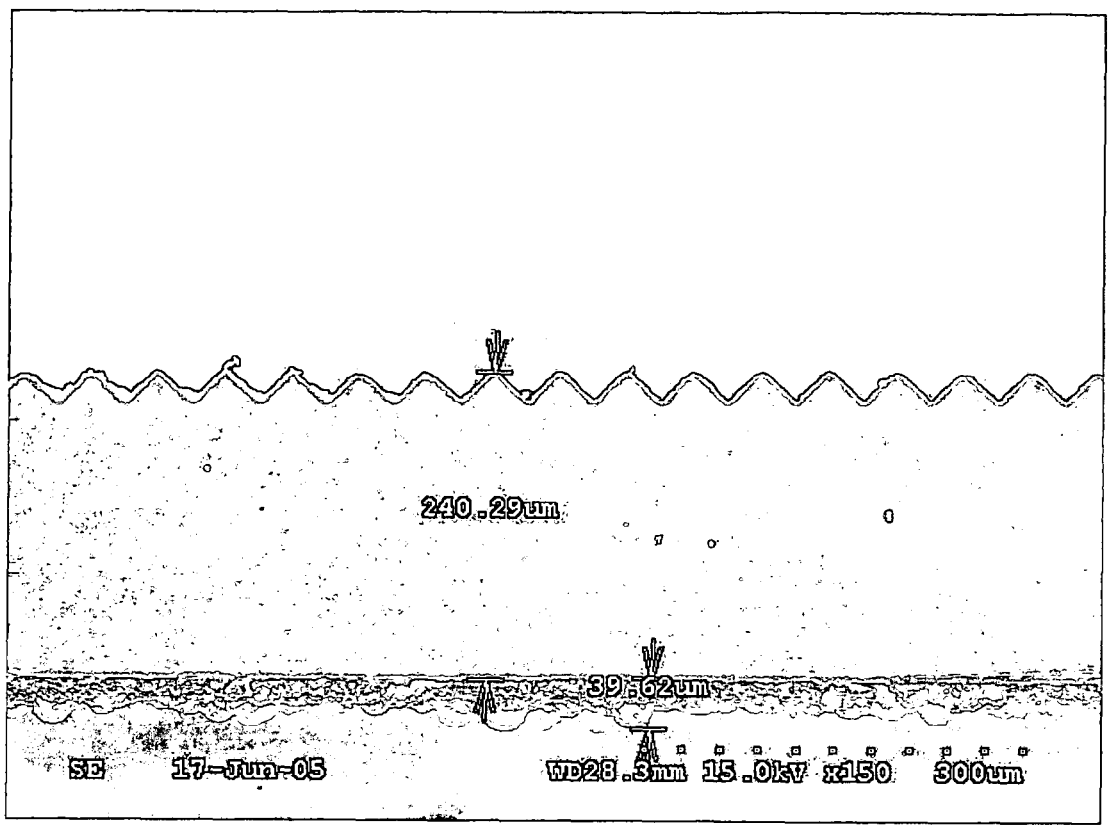
FIG. 3 is a side view of an embodiment according to the present invention.

The substrate used in the brightness enhancement film according to the present invention may be any substrate known to those having ordinary skill in the art, such as glass or plastic. The above plastic substrate does not require special restrictions, and include, for example, but is not limited to a polyester resin, such as polyethylene terephthalate (PET); a polyacrylate resin, such as polymethyl methacrylate (PMMA); a polyolefin resin, such as polyethylene (PE) or polypropylene (PP); a polyimide resin; a polycarbonate resin; a polyurethane resin; cellulose triacetate (TAC); or a mixture thereof, of which the polyester resin or polycarbonate resin is preferred, and the particularly preferred one is polyethylene terephthalate. The suitable thickness of the substrate is usually determined according to the requirements of a desired optical product, which is preferably between about 50 µm and about 150 µm.

The brightness enhancement film according to the present invention may uniformly diffuse and then condense the light from a light source, and thus possesses both the characteristics of a conventional brightness enhancement film and a diffusion film. In order to achieve the light diffusion effect, a fine convex-concave structure is formed on the light incidence surface of the substrate as a light diffusion layer, which exhibits a diffusion (Dfs) of between 5% and 90%, preferably between 40% and 90%. The process for forming the light diffusion layer is not particularly limited, and may be any of those well known to those skilled in the art, for example, screen printing, spraying, or embossing. A preferred method is to apply a coating layer having a convex-concave microstructure and a thickness of 1 µm to 50µm on the surface of the substrate. This coating layer is capable of diffusing light, and comprises particles and a bonding agent, wherein the diameter of the particles ranges from 1 µm to 100 µm, preferably from 10 µm to 50 µm. There are no restrictions on the shape of the particles, which can be, for example, spherical or diamond-shaped. There are no restrictions on the type of the particles, which may be organic particles, such as, acrylic resin, styrene resin, urethane resin, and silicone resin, and a mixture thereof; or inorganic particles, such as, zinc oxide, silicon dioxide, titanium dioxide, zirconia, aluminium oxide, zinc sulfide, barium sulfate, or a mixture thereof, or a mixture of both types of particles, of which the organic particles are preferred.

The suitable bonding agents that can be used in the present invention do not require special limitations, and include, for example, but are not limited to, acrylic resin, polyamide resin, epoxy resin, polyimide resin, or polyester resin.

The coating layer with the convex-concave microstructure according to the present invention can optionally include a curing agent. The curing agent is used in the present invention to form a crosslinking with the bonding agent through the chemical bonding between the molecules, such that molecular chains are crosslinked into a net structure, thereby generating a macro molecule with a strong internal bonding and not easy to be melted. The curing agent suitable for the present invention is well known to those skilled in the art, which is, for example, but not limited to polyisocyanate.

In order to achieve the brightness enhancement effect, the substrate according to the present invention comprises at least one optical layer as a brightness enhancement layer, which is formed by coating a composition comprising a resin, a photo initiator, and a crosslinking agent on the substrate. The suitable resins are well known to those skilled in this art, including for example, but being not limited to a polyester resin, a polyacrylate resin, or a polycarbonate resin. There are no special restrictions regarding the photo initiator suitable for the present invention, which is a substance that generates free radicals when being irradiated by light and initiates polymerization through the transfer of the free radicals, and which can be, for example, benzophenone. The crosslinking agent suitable for the present invention may be, for example, a (meth) acrylate with one or more functional groups, preferably those with multiple functional groups, so as to raise the glass transition temperature. The above brightness enhancement layer may optionally contain additives known to those skilled in the art, which include, for example, but are not limited to, an inorganic filler, a leveling agent, a defoaming agent, and an anti-static agent.

The brightness enhancement layer of the present invention may be in the form of a planar film or a microstructure, wherein the microstructure is, for example, but not limited to being in the form of a regular or irregular prism pattern, rounded prism pattern, solid angle pattern, bead pattern, or lenticular pattern, of which the prism pattern is preferred as it will provide a better effect on condensing light and thus will enhance the luminance of displays.

The brightness enhancement film of the present invention can be used in the backlight module of a display. The brightness enhancement film of the invention is used for both diffusing light and condensing light, and the light can be uniformly diffused when passing through the film, thereby eliminating the bright and dark stripes and achieving the light uniformity.

The following examples are intended to further describe the present invention, but not to limit the scope of the present invention. Any modifications and variations easily achieved by those skilled in the art are included in the scope of disclosures of the specification and appended claims.

EXAMPLES

A brightness enhancement film according to the present invention was prepared according to the following method, and the composition used in each example is shown in Table 1.

50% by weight of EM210® (2-phenoxy ethyl acrylate, commercially available from Eternal Company) and 50% by weight of 624-100® (epoxy acrylate, commercially available from Eternal Company) were mixed, and a photo initiator (benzophenone, Chivacure® BP, commercially available from Double Bond Chemical Industry) was added thereto. The mixture was stirred to form a colloidal coating composition.

The colloidal coating composition was divided to several portions and each portion incorporated 15 weight %, based on the weight of the colloidal coating composition of each portion, of organic particles (J-4P and GR-400T, commercially available from Neagari Company). Thereafter, the mixture was coated onto a BEF II film (a brightness enhancement film commercially available from 3M Company), and the coated film was dried by energy rays to obtain an optical film with a thickness of 40 μm.

The coated films thus obtained were subjected to a haze and diffusion test (by NDH 2000 provided by NIPPON DENSHOKU) and a brightness enhancement test (by BM-7® provided by TOPCON Company). The results of the tests are shown in Table 1.

TABLE 1

|   | Haze | Diffusion (Dfs) | Brightness Enhancement |
|---|------|-----------------|------------------------|
| 1 | 93   | 7               | 1.55                   |
| 2 | 96   | 9               | 1.54                   |
| 3 | 97   | 76              | 1.53                   |
| 4 | 98   | 80              | 1.50                   |

1. A BEF II film without any coatings on the back surface of the film.

2. A BEF II film with a coating containing plastic particles having an average particle size of 2 μm on the back surface of the film.

3. A BEF II film with a coating containing plastic particles having an average particle size of 14 μm on the back surface of the film.

4. A BEF II film with a coating containing plastic particles having an average particle size of 40 μm.

It is clear from the results shown in Table 1 that, with a coating containing organic particles, particularly the organic particles having a diameter ranging from 10 μm to 50 μm, on the back surface of the brightness enhancement films, the haze and diffusion of the films are enhanced. Therefore, the brightness enhancement film of the present invention can be used for both diffusing light and condensing light.

What is claimed is:

1. A brightness enhancement film, comprising:
   a substrate with a light diffusion layer and a brightness enhancement layer, said light diffusion layer being formed by applying a coating layer and having a convex-concave structure on one side of the substrate, wherein the diffusion of the light diffusion layer is between 5% and 90% said brightness enhancement layer being formed by a coating composition with a same refractive index and having a microstructure on the other side of the substrate wherein the microstructure is selected from the group consisting of a regular or irregular prism pattern, rounded prism pattern, rounded prism pattern, solid angle pattern, bead pattern and lenticular pattern.

2. The brightness enhancement film as claimed in claim 1, wherein the diffusion of the light diffusion layer is between 40% and 90%.

3. The brightness enhancement film as claimed in claim 1, wherein the coating layer with the convex-concave microstructure comprises particles having a diameter ranging from about 1 μm about 100 μm.

4. The brightness enhancement film as claimed in claim 3, wherein the coating layer with the convex-concave microstructure comprises particles having a diameter ranging from about 10 μm to about 50 μm.

5. The brightness enhancement film as claimed in claim 3, wherein the particles are selected from the group consisting of organic particles, inorganic particles, and a mixture thereof.

6. The brightness enhancement film as claimed in claim 5, wherein the organic particles are selected from the group consisting of acrylic resin, styrene resin, urethane resin, and silicone resin, and a mixture thereof.

7. The brightness enhancement film as claimed in claim 5, wherein the inorganic particles are selected from the group consisting of zinc oxide, silicon dioxide, titanium dioxide, zirconia, aluminium oxide, zinc sulfide, and barium sulfate, and a mixture thereof.

8. The brightness enhancement film as claimed in claim 1, wherein the coating layer comprises a bonding agent.

9. The brightness enhancement film as claimed in claim 8, wherein the bonding agent is selected from the group consisting of acrylic resin, polyamide resin, epoxy resin, polyimide resin, and polyester resin.

10. The brightness enhancement film as claimed in claim 1, wherein the substrate is plastic or glass.

* * * * *